United States Patent
Bader

(10) Patent No.: US 7,278,949 B2
(45) Date of Patent: Oct. 9, 2007

(54) PLANETARY TRANSMISSION

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 194 days.

(21) Appl. No.: 10/557,437

(22) PCT Filed: May 18, 2004

(86) PCT No.: PCT/EP2004/005331

§ 371 (c)(1),
(2), (4) Date: Nov. 18, 2005

(87) PCT Pub. No.: WO2004/111493

PCT Pub. Date: Dec. 23, 2004

(65) Prior Publication Data

US 2006/0258502 A1    Nov. 16, 2006

(30) Foreign Application Priority Data

Jun. 13, 2003    (DE) ............................... 103 26 677

(51) Int. Cl.
*F16H 3/44* (2006.01)
(52) U.S. Cl. .................................................. 475/298
(58) Field of Classification Search ............... 475/298, 475/299, 300
See application file for complete search history.

(56) References Cited

U.S. PATENT DOCUMENTS 2,863,333 A * 12/1958 Golrick ..................... 475/296
4,189,960 A    2/1980 Holdeman
4,347,762 A    9/1982 Holdeman
5,643,129 A * 7/1997 Richardson ................. 475/204
6,196,944 B1    3/2001 Schmitz

FOREIGN PATENT DOCUMENTS

| DE | 1 198 213 | 8/1965 |
| DE | 2 148 090 | 4/1973 |
| DE | 285 813 A5 | 1/1991 |
| DE | 41 21 709 A1 | 1/1992 |
| DE | 198 51 895 A1 | 5/2000 |
| GB | 191268 | 1/1923 |
| GB | 415531 | 8/1934 |
| GB | 1045972 | 10/1966 |

* cited by examiner

*Primary Examiner*—Dirk Wright
(74) *Attorney, Agent, or Firm*—Davis Bujold & Daniels, P.L.L.C.

(57) ABSTRACT

Proposed is a planetary transmission (8) comprising an internal gear (24), a sun gear (52) and a planet carrier (10), upon which at least one planet gear (20) is supported. The planetary transmission (8) possesses a clutch apparatus with a sliding sleeve (66), which in a first shift-position enables a direct connection between one of the shafts (44) driving the planetary transmission (8) and an output shaft (12) of the planetary transmission (8). In a second shift-position, the connection of the sliding sleeve (66) enables a change in the speed of rotation between the driving shaft (44) and the output shaft (12) of the planetary transmission (8). The planet gear (20) is so supported on the planet carrier (10), that in case of a shifting from a one shift-position into a respective other shift-position, the planet gear (20) on the planet carrier (20) becomes axially slidable.

14 Claims, 4 Drawing Sheets

PLANETARY TRANSMISSION

This application is a national stage completion of PCT/EP2004/005331 filed May 18, 2004 which claims priority from German Application Serial No. 103 26 677.1 filed Jun. 13, 2003.

FIELD OF THE INVENTION

The invention concerns a planetary transmission.

BACKGROUND OF THE INVENTION

Commercial vehicles with a large number of gear positions frequently possess an auxiliary range gear train, which acts on the main drive shaft and engages itself with the existing gear stages. With such an auxiliary range gear train, it is possible that the total ratio of the main transmission is increased, since all gear stages of this main transmission can be employed along with each gear stage of the auxiliary range gear train, and in at least one gear stage of the auxiliary range gear train, the ratio of the gear stages of the main transmission are adjusted to be either under or over their designed ratio.

An auxiliary range gear train for automobiles has been made known by DE 41 21 709 A1. With a planet gear arrangement of this kind installed following the main transmission, the possibility exists, of operating the motor vehicle within the framework of the gear stages of its main transmission, respectively, in two different speed ranges. When shifted into a first, slow ratio stage of the auxiliary range gear train, the internal gear of the planetary transmission is coupled by means of a clutch to the transmission housing so that the output shaft of the auxiliary range gear train possesses a lesser speed of rotation than does the output shaft of the main transmission. In a second shifting stage, a direct through-drive from the output shaft of the main transmission onto the output shaft of the auxiliary range transmission is effected, whereby a clutch establishes a direct connection between the output shaft of the main transmission and the output shaft of the auxiliary range gear train. The shifting mechanism to carry this out is expensive in its design and fabrication.

As a further development, DE 198 51 895 A1 teaches an auxiliary range gear train constructed as a planet gear system. In this case, the internal gear of the planet gearing is non-rotatably bound to the housing of the transmission. The sun gear of the planetary transmission is coaxially aligned to the output shaft of the main transmission and, compared to the output shaft of the main transmission, it is free in its rotation. For the construction of a step-down ratio between the output shaft of the main transmission and the output shaft of the auxiliary range gear train, the sun gear can be non-rotatably bound with the output shaft of the main transmission. Once again, this design is complex, expensive in design and time consuming. Furthermore, the individual components raise problems with regard to support.

Thus the invention has the purpose of improving a planetary transmission and especially improving the component structure of the bearing support.

SUMMARY OF THE INVENTION

A planetary transmission comprising an internal gear, a sun gear and a planet carrier, upon which at least one planet gear is supported, possesses a clutch featuring a sliding sleeve which, in one stage suitable for one gear position, establishes a direct connection between a shaft driving the planetary transmission and an output shaft of the planetary transmission. In a shifting position, other than that above, a speed of rotation change is effected between the driving shaft and the output shaft of the planetary transmission. The planet gear is so mounted on the bearing of the planet carrier, that upon a shifting from one given stage into a respective successive stage, the planet gear on the planet carrier is axially displaceable. Normally, in a planetary transmission of this design, three or five planet gears are to be found which are distributed about the circumference thereof.

Advantageously, relative to the internal gear and to the sun gear, the planet gear is axially affixed so that an axial sliding of the planet gear simultaneously enables, an axial sliding of the internal gear and the sun gear.

In the case of a particularly advantageous embodiment, the planet gear experiences a smaller return displacement than does the sliding sleeve, when sliding from the one gear position into the respective next position, which impels the planet gear.

In one advantageous embodiment, the sliding sleeve has the capability of moving the sun gear axially and thereby the planet gear on the planet carrier, likewise, slides axially.

One design example of the present invention shows the sun gear accompanied by a pressure bolt, which coacts with the sliding sleeve, even though, in another embodiment, the sliding sleeve and the sun gear are constructed together as a one-piece component.

Advantageously, both the internal gear as well as the sun gear possess toothed pressure compensators which adjoin the planet gear.

In another embodiment, the sliding clutch has a neutral position, which lies between the two shift-positions and by which the output shaft of the planetary transmission is not driven.

A further advantageous embodiment of the invention shows the planet gear on the planet carrier running in a roller bearing. Advantageously, the roller bearing has a multi-row design. The combined relative support of the sun gear plus the driving gear of the planetary transmission, likewise, form a possibility for another embodiment design.

The planetary transmission presents itself especially advantageous here as an auxiliary range gear of a motor vehicle, which is designed as a torque transmitting drive string interlocked to a main transmission. By this addition, the output shaft of the main transmission forms the driving shaft of the planetary gear transmission.

Likewise, as an exceptionally advantageous embodiment, the main transmission comprises two countershafts and one floating principal shaft supported between the countershafts, which serves as an output of the main transmission which, in turn, forms the input shaft of the planetary gear transmission and which, at its end, is supported by the sun gear of the planetary transmission.

Advantageously, the bearing of the end of the main drive shaft includes a pin with a slotted profile.

BRIEF DESCRIPTION OF THE DRAWINGS

The invention will now be described, by way of example, with reference to the accompanying drawings in which.

DETAILED DESCRIPTION OF THE INVENTION

Figure 1:
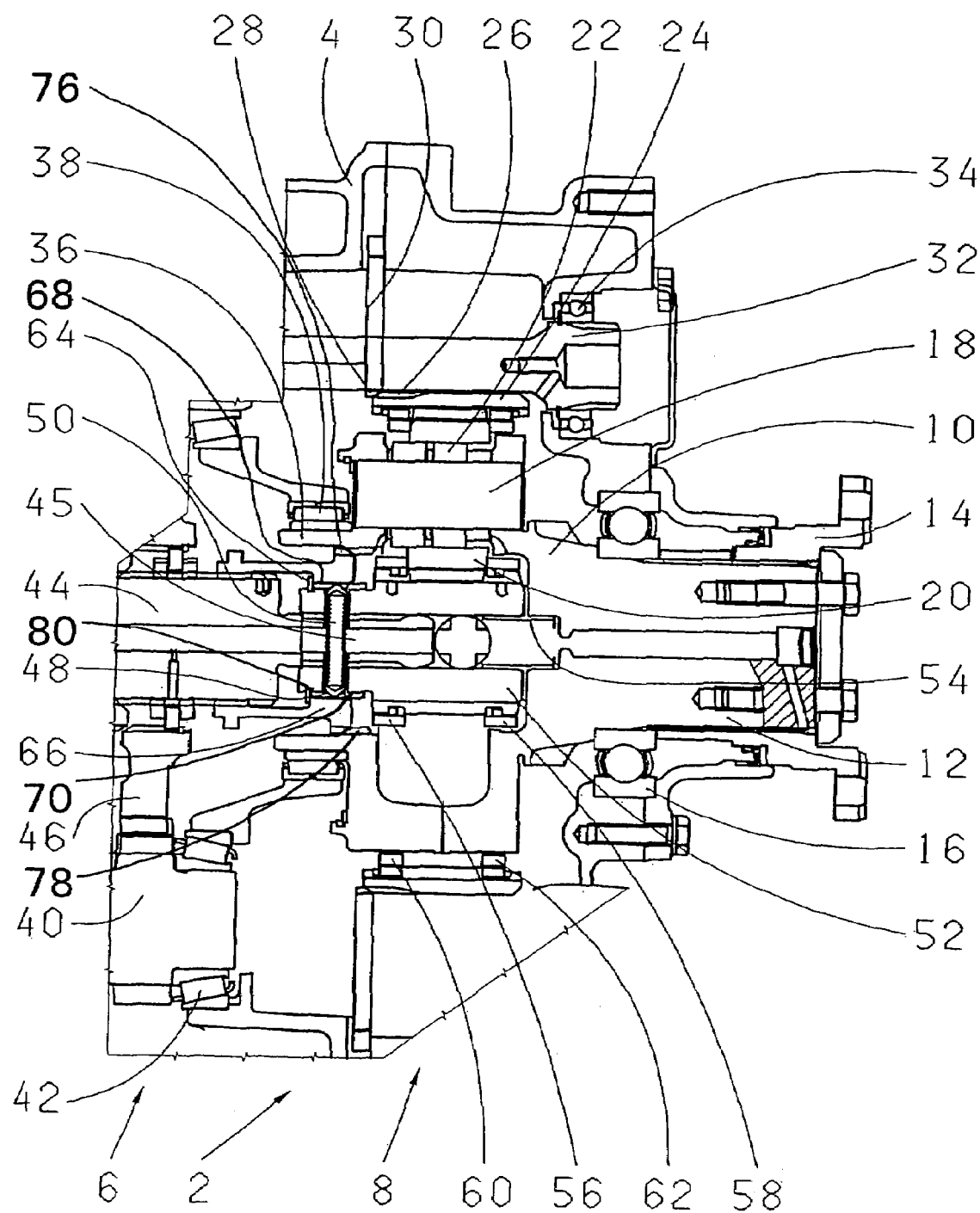
FIG. 1 is a planetary transmission with a first shifting apparatus in a neutral position.

In a transmission housing 4 of a vehicle, a shifting transmission 2 possesses a main transmission 6 and thereon, an auxiliary range gearing in the form of a planetary transmission 8. The planetary transmission 8 includes a planet carrier 10, which is designed as a common component with an output drive 12 of the shifting transmission 2. About the output drive shaft 12 is a flange 14 and the output drive 12 is supported by a bearing arrangement 16 in the transmission housing 4. The planet carrier 10 has several, evenly distributed planet bolts 18 about its circumference. Of these planet bolts 18, in the illustrations, only one bolt is shown. On the planet bolt 18, supported by a roller bearing 22, is shown only one planet gear 20. Distributed orderly about the circumference of the planet carrier 10 would normally be three or five such planet gears 20. The roller bearing 22 is constructed as a double row, cylindrical roller bearing or an equivalent needle bearing. The planet gear 20 is externally encompassed by an internal gear 24, which exhibits a shift toothing 26. The shift toothing 26 engages itself in a base plate 30. The base plate 30 is held in non-rotatable fashion in the transmission housing 4. In this arrangement, the base plate 30 can be cast into the transmission housing 4, or be clamped between the individual elements of the transmission housing 4 as a separate plate. A shaft 32 serves as the possible drive of an auxiliary power take-off and is supported by a bearing arrangement 34 in the transmission housing 4.

The planet carrier 10 has a projection 36 located on that side of the planetary transmission 8 which is opposite to the output drive shaft 12, on which the planet carrier 10 is held by a roller bearing 38 in the transmission housing 4. Also, a countershaft 40 of the main transmission 6 is supported in a bearing arrangement 42 in the transmission housing 4. A main drive shaft 44 of the main transmission 6 carries a toothed gear 46 on its end for the reverse gear ratio. The gear 46 is placed on the main drive shaft 44 with allowance for small radial play. This light play is typical for a shifting transmission with a power branching into two countershafts. At the end of the main drive shaft 44 is provided a pin 45, which exhibits a slotted profile. The pin 45 includes a pressure bolt 48, which is pressed in an outward direction by a spring 50. On this account, the pressure bolt 48 extends itself through a sun gear 52 of the planetary transmission 8, which has been placed on the pin 45 of the main drive shaft 44, whereby the main drive shaft 44 bases itself in the sun gear 52. Between the sun gear 52 and the output drive shaft 12, i.e., the planet carrier 10, is placed a shell 54 with a disk. This arrangement allows a common fitting and a mutual sliding between the sun gear 52 on the output drive shaft 12. Accordingly, the speed of rotation of the sun gear 52 and that of the output drive shaft 12 need not be the same.

On the sun gear 52 are two toothed pressure compensators 56 and 58, which restrict any axial movement of the planet gear 20 relative to the sun gear 52. However, in this connection, a contact of the planet gear 20 against the toothed pressure compensators 56, 58 is allowed, in order to pick up an axially directed force, which said force results from inclined toothing of the planetary transmission 8. Two additional toothed pressure compensators 60 and 62 are placed radially within the internal gear 24 and again permit a contacting meeting of the planet gear 20. The two toothed pressure compensators 60 and 62 restrict an axial movement of the planet gear 20 relative to the internal gear 24. By way of this arrangement of the toothed pressure compensators 56, 58, 60 and 62, the sun gear 52, the planet gear 20 and the internal gear 24 move themselves as a packet. This unified movement is such that an axial movement, introduced by the sun gear 52, and transferred by the planet gear 20 results in an equally directed axial movement of the internal gear 24.

In FIG. 1, the pressure bolt 48 coacts with a detent 64, i.e., a holding means, within a sliding sleeve 66 and thereby engage the detent 64. By this means, the sliding sleeve 66 is held in a neutral position. The sliding sleeve 66 has a first internal toothing 68 (FIG. 2), which engages itself in an external toothing 70 on the sun gear 52 and a non-rotatable connection between the sliding sleeve 66 and the sun gear 52 is established (see FIG. 2). For the formation of a non-rotatable connection between the sliding sleeve 66 and the main drive shaft 44, the sliding sleeve 66 has a second internal toothing 72, which engages itself in an external toothing 74 on the main drive shaft 44.

For the bringing about of an optional, non rotatable connection of the main drive shaft 44 with the planet carrier 10 for the formation of a direct binding of the main transmission 6 with the output drive shaft 12 at a continuing equal speed of rotation, the sliding sleeve 66 has a shift-toothing 76, which can engage itself in a shift toothing 78 on the projection 36 of the planet carrier 10.

FIG. 1 presents the planetary transmission 8 in a neutral position. Neither the shift-toothing 26 and 28, nor the shift-toothing 76 and 78 engage each other.

The pressure bolt 48 enters into the detent 64 on the sliding sleeve 66. The sun gear 52 finds itself positioned to the right (as seen in the drawing). The planet gear 20 is supported on the planet bolt 18 only on a cylindrical roller bearing of the roller bearing 22. The planetary transmission 8 is load free, hence a simple bearing suffices, which brings about a small loss.

If now the sliding sleeve 66 is pushed to the left by an actuator (not shown in the drawing), then the sliding sleeve 66, likewise, draws the sun gear 52 to the left by actuating a ring 80 left being in accord with the drawing. This motion is described in FIG. 2. The planet gear 20 is, likewise, moved and accompany therewith by the toothed pressure compensators 56 and 58 and, in turn, brings the internal gear 24 to the left along with it, powered by the toothed pressure compensators 60 and 62. By this action, the two shift toothings 26 and 28 engage each other, whereby the internal gear 24 becomes non-rotatably affixed. Thereby, the planet carrier 10 turns in a known manner, as compared to the main drive shaft 44 in a slower ratio. At this point, the planetary transmission 8 is under a loaded condition, because the total torque is now being taken over by the planet gear 20. On this account, it is necessary, that the bearing support of the planet gear 20 be reinforced by the planet bolt 18. Due to the sliding of the planet gear 20 to the left by the sun gear 52, the planet gear 20 is also drawn onto the second cylindrical roller bearing of the roller bearing support 22. The situation now is that a clearly increased load capacity of the roller bearing support 22 is made available. Instead of several cylindrical roller bearings, a multi-row bearing can be considered, in particular, a two-row needle bearing.

Figure 2:
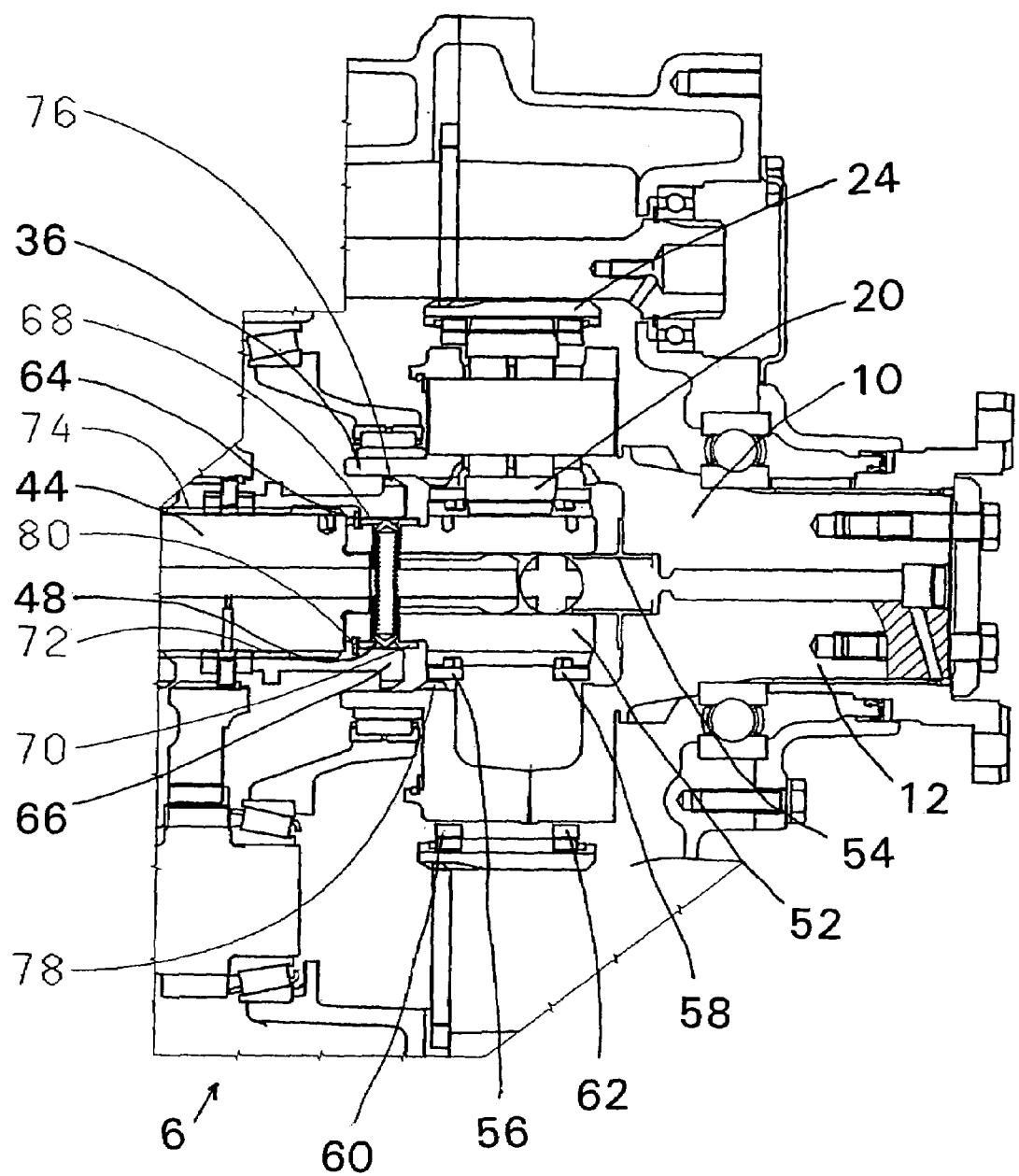
FIG. 2 is the shifting apparatus according to FIG. 1 in a first gear position.

If now, the sliding sleeve 66, as illustrated in FIG. 2, is pushed to the right by the (unseen) actuator, then the sliding sleeve 66 moves the sun gear 52, likewise, to the right (per the drawing) by way of the detent 64 and the pressure bolt 48. The planet gear 20 is pushed by the toothed pressure compensators 56 and 58 onto the sun gear 52 and of itself then pushes, the internal gear 24 to the right into the neutral position by way of the toothed pressure compensators 60 and 62 according to FIG. 1. At this point, the sun gear 52 with the shell 54 lies against the planet carrier 10.

Figure 3:
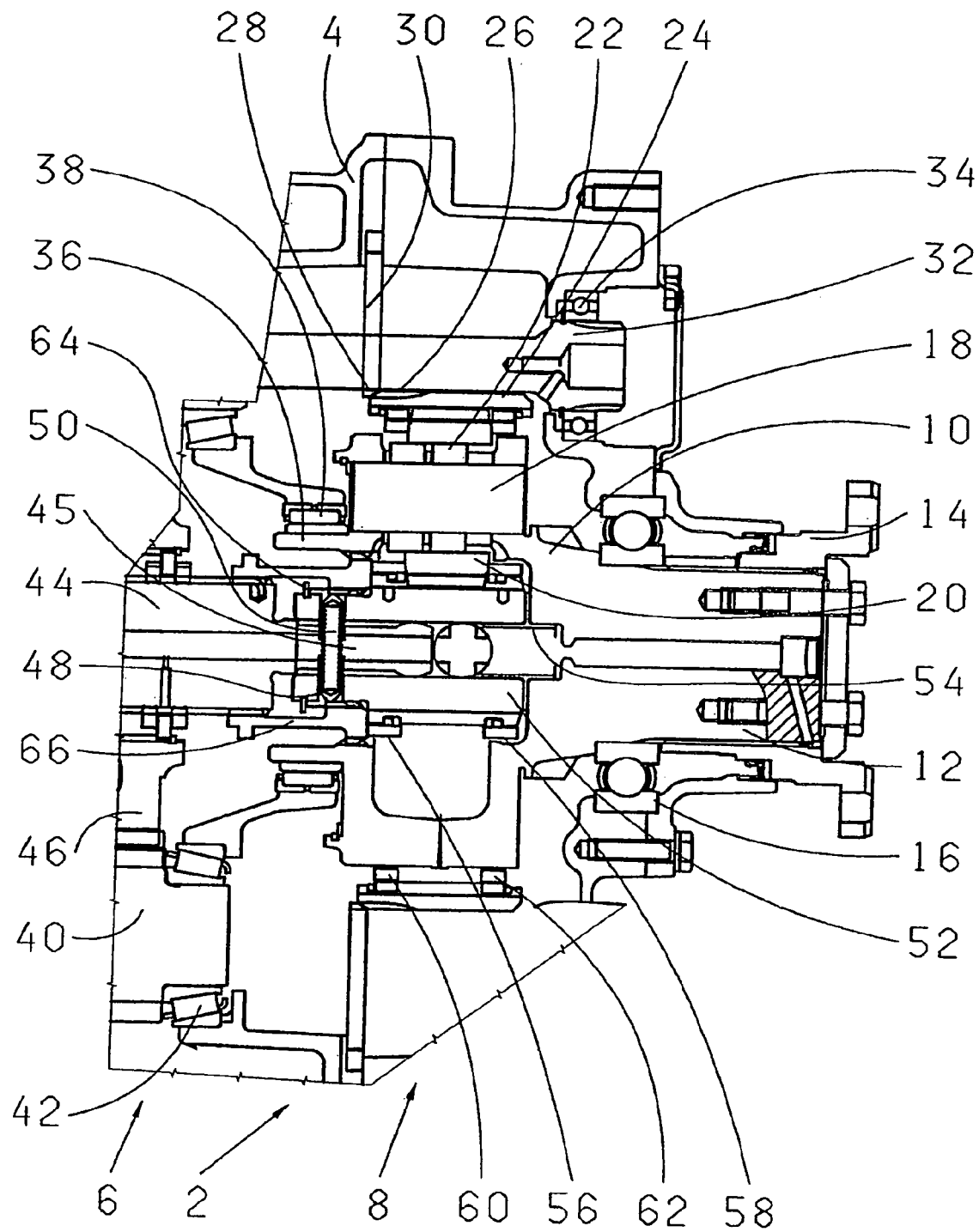
FIG. 3 is the shifting apparatus according to FIG. 1 in a second shifting position.

If the sliding sleeve 66 is caused to move to the right out of the neutral position (FIG. 1), then the force of the spring 50 on the pressure bolt 48 is overcome by the detent 64 and the sliding sleeve 66 moves further to the right. When this occurs, the sun gear 52 is not complementarily moved axially. On this account, the sun gear 52 and therewith the planet gear 20 slidingly cover a small path back, as does the sliding sleeve 66 which moves the sun gear 52 and therewith the planet gear 20. The shift toothing 76 on the sliding sleeve 66 engages the complementary shift toothing 78 on the projection 36 of the planet carrier 10, whereby a non-rotatable connection between the main drive shaft 44 and the output drive shaft 12 is achieved. This is presented in FIG. 3. Thereby, in a known way, the planet carrier 10 turns itself in reference to the main drive shaft 44 at the same speed of rotation. Now the planetary transmission 8 runs free from load, while the total torque is taken over by the planet carrier 10. The bearings of the planet gear 20 on the planet bolt 18 must not be supported, so that the planet gear 20 can be carried only on a cylindrical roller bearing of the roller bearing 22 as is the case in the neutral position.

Figure 4:
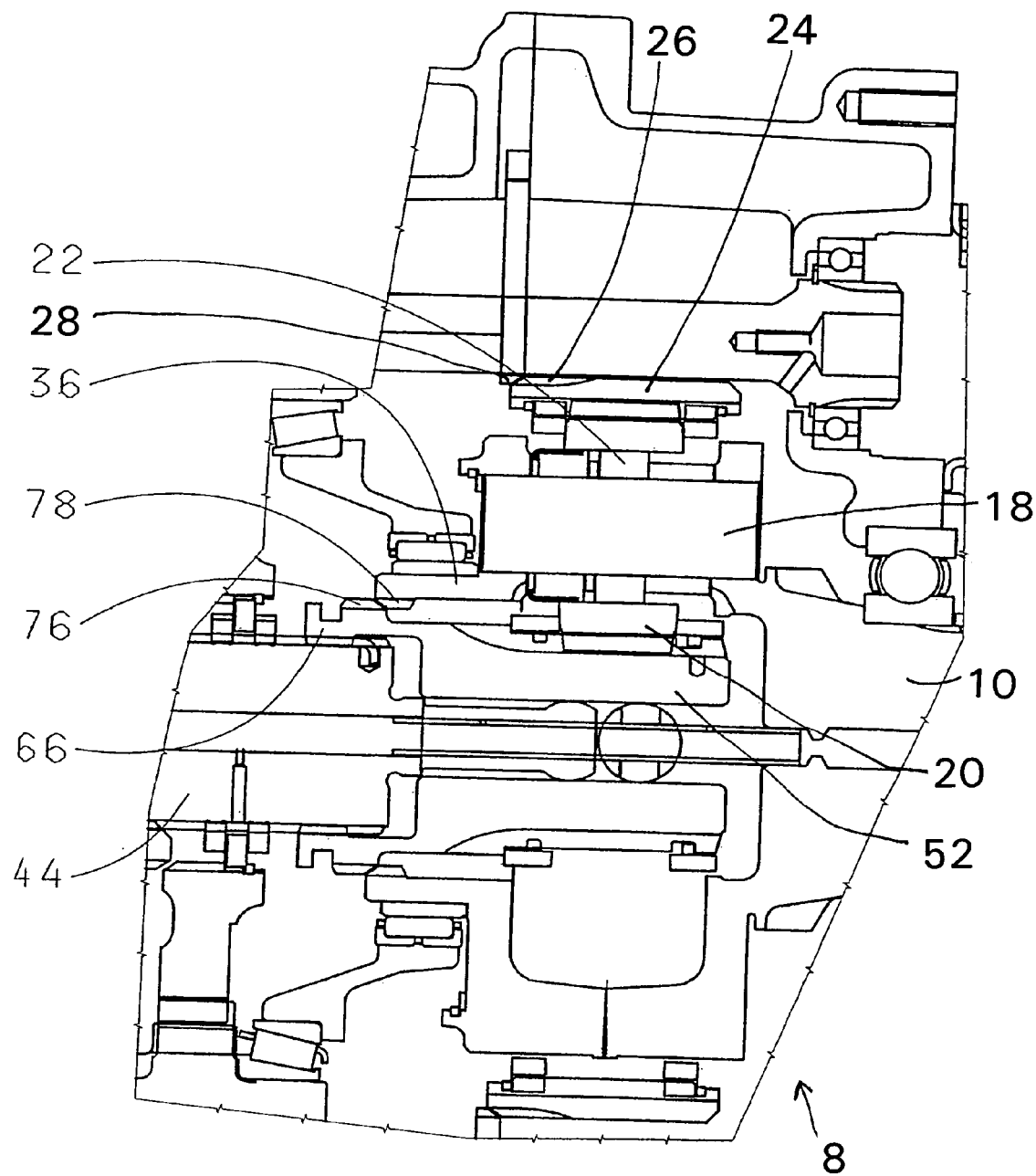
FIG. 4 is a planetary transmission with a second shifting apparatus in a neutral position.

FIG. 4 illustrates a changed design of the sliding sleeve 66. In this case, the sliding sleeve 66 is constructed as being of one part with the sun gear 52. In this arrangement, during an axial sliding of the sliding sleeve 66, within the three possible shift positions, the sun gear 52 and therewith the planet gear 20 and the internal gear 24 always move in common. On this account, it is necessary that sufficient operational space be made available in the planetary transmission 8.

The attainment of the slow ratio is carried out as is explained in regard to FIG. 2. By means of the one piece design of the sliding sleeve 66 and the sun gear 52, the pressure bolt and the detent can be eliminated. If now the sliding sleeve 66 is pushed to the right, (per drawing) by an actuator and out of the shifting position for the slow ratio, then the sliding sleeve 66 necessarily pushes the attached sun gear 52 with it, likewise to the right. The planet gear 20 slides along, being pushed by the toothed pressure compensators 56 and 58 on the sun gear 52 and, on its own, pushes the internal gear 24 with the aid of the toothed pressure compensators 60 and 62. As this occurs, the internal gear 24 moves to the right until the neutral position shown in FIG. 4 is reached. The sun gear 52 does not lie on the planet carrier 10.

If the sliding sleeve 66 is pushed further to the right out of the neutral position (shown in FIG. 4), then accordingly, the sleeve 66 also axially pushes the sun gear 52 to the right. The shift toothing 76 on the sliding sleeve 66 engages in the shift toothing 78 on the projection 36 of the planet carrier 10, whereby a non-rotatable connection is brought about between the main drive shaft 44 and the output drive shaft 12. The planetary transmission 8 runs free of load again, because the entire torque is taken over by the planet carrier 10. The support of the planet gear 20 on the planetary bolt 18 must not be reinforced, so that the planet gear 20, as is the case in the neutral position, can be carried only by a cylindrical roller bearing of the roller bearing 22.

For the formation of a stable end position, and for the avoidance of an undesirable problematic sliding, it is possible that the toothing 26, 28 and 76 to 78 be designed with a roll-back.

By way of the arrangement, according to the invention, a dog-clutch type shifting device is formed for a planetary transmission which is placed on the main drive shaft of the transmission. The shifting of the rapid ratio of the auxiliary range gear train by direct connection is done free of load. The short shifting path of the toothings on the auxiliary range gear train enables short operating levers on the planetary bolts. Roll bearings carry the planet gears safely on the planetary bolts.

Fundamentally, the invented shifting apparatus is adaptable, both for a shifting transmission with one countershaft as well as for a shifting transmission with a load splitter requiring several countershafts.

REFERENCE NUMERALS 2 shifting transmission
4 transmission housing
6 main transmission
8 planetary transmission
10 planet carrier
12 output drive shaft
14 flange for 12
16 bearing arrangement
18 planet bolt
20 planet gear
22 roller bearing
24 internal gear
26 shift toothing
28 shift toothing
30 support base plate
32 shaft
34 bearing arrangement
36 projection
38 roller bearing
40 countershaft
42 bearing arrangement
44 main drive shaft
45 pin
46 gear
48 pressure bolt
50 spring
52 sun gear
54 shell
56 toothed pressure compensator
58 toothed pressure compensator
60 toothed pressure compensator
62 toothed pressure compensator
64 detent
66 sliding sleeve
68 internal toothing
70 external toothing
72 internal toothing
74 external toothing
76 shift toothing
78 shift toothing
80 ring

The invention claimed is:

1. A planetary transmission (8), comprising an internal gear (24), a sun gear (52) and a planet carrier (10), upon which at least one planet gear (20) is mounted and which possesses a clutch having a sliding sleeve (66), which, in a first shifting position enables a direct connection between one shaft (44) which drives the planetary transmission (8) and an output shaft (12) of the planetary transmission (8), and in a second shifting position, enables a change in the speed of rotation between the main drive shaft (44) and the output shaft (12) of the planetary transmission (8), the planet gear (20) is supported such that the planet carrier (10), when shifting from a one shift-position into an other shift-position, the planet gear (20) on the planet carrier (10) axially slides.

2. The planetary transmission (8) according to claim 1, wherein the planet gear (20) is axially affixed relative to the internal gear (24) and to the sun gear (52), such that are an axial sliding of the planet gear (20) enables a simultaneous axial sliding of the internal gear (24) and the sun gear (52).

3. The planetary transmission (8) according to claim 1, wherein the sliding sleeve (66) has the capability of moving the sun gear (52) axially and therewith the ability to axially slide the planet gear (20) on the planet carrier (10).

4. The planetary transmission (8) according to claim 1, wherein by sliding the planet gear (20) from a one shift-position into an other shift-position, the planet gear (20) travels a smaller sliding path back, than that of the sliding sleeve (66) which moves the planet gear (20).

5. The planetary transmission (8) according to claim 1, wherein the sun gear (52) includes a pressure bolt (48), which coacts with the sliding sleeve (66).

6. The planetary transmission (8) according to claim 1, wherein the sliding sleeve (66) and the sun gear are constructed in one piece.

7. The planetary transmission (8) according to claim 1, wherein both the internal gear (24) as well as the sun gear (52) possess toothed pressure compensators (56, 58, 60, 62) which lie adjacent to the planet gear (20).

8. The planetary transmission (8) according to claim 1, wherein the clutch possesses a neutral position, which lies between the two shift-positions and in which the output shaft (12) of the planetary transmission (8) is not driven.

9. The planetary transmission (8) according to claim 1, wherein the planet gear (20) on the planet carrier (10) is supported by a roller bearing (22).

10. The planetary transmission (8) according to claim 9, wherein the roller bearing (22) includes a multi-row bearing.

11. The planetary transmission (8) according to claim 1, wherein the sun gear (52) and the main drive shaft (44) of the planetary transmission (8) are supported relative to one another.

12. The planetary transmission (8) according to claim 1, wherein a support at the end of the main drive shaft (44) includes a pin (45) with a slotted profile.

13. The planetary transmission (8) according to claim 1, wherein the planetary transmission (8) is presented as an auxiliary gear train, which is designed as a torque transmitting drive string connected to a principal gear drive (6) and by which the output shaft (44) of a principal gear drive (6) forms a driving shaft of the planetary transmission (8).

14. The planetary transmission (8) according to claim 1, wherein the principal gear drive (6) includes two countershafts (40) and one bearing supported main drive shaft (44) which floats between the two countershafts (40), which forms the output shaft of the principal gear drive (6) and which in turn forms the driving shaft of the planetary transmission (8) and which, on an end (46) is supported in the sun gear (52) of the planetary transmission (8).

* * * * *